United States Patent Office 2,732,391
Patented Jan. 24, 1956

2,732,391

HALOGENATED ORGANOSILICON COMPOUNDS

John E. Noll, Monroeville, Pa., assignor to Dow Corning Corporation, Midland, Mich., a corporation of Michigan No Drawing. Application December 29, 1954, Serial No. 478,543

6 Claims. (Cl. 260—448.2)

This invention relates to organosilicon derivatives of halophenoxy acetic acids.

It is known that halophenyl groups attached to silicon in siloxane molecules improve the lubricity of siloxanes. In addition it has been found that when the halophenyl radical is on the end of a siloxane chain improved lubricity is obtained without sacrificing substantially the desirable temperature viscosity coefficient of the siloxane. However, present methods of preparing materials having the halophenyl group attached directly to a silicon on the end of a chain are cumbersome and quite expensive. The present materials provide an economically feasible way of producing these desirable materials.

It has long been desired to decrease the rate at which certain herbicides such as dichlorophenoxy acetic acids act upon plants. This is needed because often the present compounds react so fast that the leaf dies before the poison has spread throughout the plant. As a result the foliage is killed but the roots are unharmed, therefore, the weed sprouts again in a fairly short time. If the action of the herbicide could be delayed sufficiently long for it to be distributed throughout the plant before circulation is stopped, then the whole plant would die.

It is the object of the present invention to provide improved siloxane lubricants and to provide novel herbicides of improved killing capacity.

This invention relates to organosilicon compounds of the formula

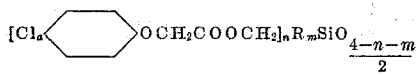

in which $a$ has a value from 1 to 5 inclusive, $n$ has a value from 1 to 2 inclusive, $m$ has a value from 0 to 3 inclusive and R is a monovalent hydrocarbon radical or a halogenated aryl hydrocarbon radical.

The compounds of this invention are prepared by reacting the alkali metal salts of chlorinated phenoxy acetic acids with halomethylsiloxanes having 1 or 2 halomethyl groups per silicon atom. The reaction may be represented schematically as follows:

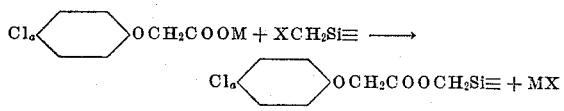

This reaction is best carried out in solvents such as dimethylformamide, pyridine, ethers, aliphatic and aromatic hydrocarbons and acetonitrile. In general, the reaction goes best when the reactants are heated above 50° C. and is usually carried out at the reflux temperature of the solvent.

For the purpose of this invention any chlorinated phenoxy acetic acid having at least 1 chlorine atom substituted on the phenyl ring can be employed. Specific examples of operative materials are the alkali metal salts of o-chlorophenoxy acetic acid, para-chlorophenoxy acetic acid, 2,4-dichlorophenoxy acetic acid, 2,4,6-trichlorophenoxy acetic acid, 2,4,5-trichlorophenoxy acetic acid, tetrachlorophenoxy acetic acids and pentachlorophenoxy acetic acid. These acids may be employed singularly or mixtures thereof may be employed in which case the resulting siloxanes would have different isomeric forms of chlorophenoxy acetic acid groups attached thereto.

In the siloxanes of this invention R can be any monovalent hydrocarbon radical such as alkyl radicals such as methyl, ethyl, and octadecyl; alkenyl radicals such as vinyl, allyl, and cyclohexenyl; cycloaliphatic hydrocarbon radicals such as cyclohexyl and cyclohexenyl; alkaryl hydrocarbon radicals such as benzyl; aryl hydrocarbon radicals such as phenyl, xenyl and tolyl; and halogenated aryl hydrocarbon radicals such as chlorophenyl, bromoxenyl, and $\alpha,\alpha,\alpha$-trifluorotolyl.

The halomethylsiloxanes employed in the method of this invention may be prepared by direct halogenation of methyl siloxanes or of methylchlorosilanes. In the latter case the chlorosilane is then hydrolyzed with the siloxane. In those cases where the R groups are susceptible to chlorination it is best first to halogenate a methylchlorosilane and thereafter react the halomethylchlorosilane with RMgX in which R is the desired hydrocarbon radical.

The siloxanes of this invention can be copolymerized with siloxanes of the formula $$R'_z SiO_{\frac{4-z}{2}}$$

in which R' is hydrogen, a monovalent hydrocarbon radical, or a halogenated monovalent hydrocarbon radical and $z$ has a value from 0 to 3 inclusive. These copolymers may be prepared by catalytic acid copolymerization of the various siloxanes. An alternative method is to react the alkali metal salts of the above phenols with a siloxane in which only some of the silicon atoms have halomethyl groups attached thereto.

Specific examples of R' groups which can be in the copolymers of this invention are hydrogen, aliphatic hydrocarbon radicals such as methyl, ethyl, octadecyl, vinyl, allyl, cyclohexenyl; cycloaliphatic hydrocarbon radicals such as cyclohexyl and cyclohexenyl; aryl hydrocarbon radicals such as benzyl, phenyl, tolyl and xenyl and halogenated hydrocarbon radicals such as trifluorovinyl, tetrafluoroethyl, chlorophenyl, chlorotolyl, $\alpha,\alpha,\alpha$-trifluorotolyl and bromonaphthyl. It should be understood that the copolymers of this invention also include those containing $SiO_2$ units. In all cases in the copolymers of this invention there should be at least 1 siloxane unit containing a halophenoxyacetoxymethyl radical, per molecule.

The siloxanes and silanes of this invention are useful as lubricants and as additives for lubricants and as herbicides.

The following examples are illustrative only and should not be construed as limiting the invention which is properly delineated in the appended claims.

*Example 1*

2 g. mols of the potassium salt of 2,4-dichlorophenoxy acetic acid and 1 g. mol of bis-chloromethyltetramethyldisiloxane were mixed in dimethylformamide solution and refluxed for 2 hours. After removal of the precipitated potassium chloride and solvent there was obtained in 96% yield the compound

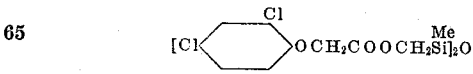

which has the following properties $n_D^{25}$ 1.5228, $d_4^{25}$ 1.270 and a saponification equivalent of 303.

1 g. mol of this disiloxane was equilibrated with 3.45 g. mols of octamethylcyclotetrasiloxane by mixing the two with 10% by weight based on the weight of the siloxane of trifluoroacetic acid and about 5% by weight concentrated sulfuric acid. The mixture was allowed to stand at room temperature for 24 hours and the resulting polymer was diluted with benzene, washed to remove all acid and then dried and the solvent removed. The resulting product was a fluid having the following properties: $n_D^{25}$ 1.4402, $n_4^{25}$ 1.05, sp. ref. .252.

This copolymer was applied to millet and radish at the rate of 12½ lbs. per surface acre causing a 100% kill of the plants. This material was also applied at a concentration of 3.3 lbs. per 100 gallons to tomato plants and the plants were killed.

*Example 2*

When chloromethylheptamethylcyclotetrasiloxane is reacted with the sodium salt of para-monochlorophenoxy acetic acid in the manner of Example 1, the compound (para - chlorophenoxyacetoxymethyl)heptamethylcyclotetrasiloxane is obtained).

*Example 3*

When the sodium salt of 2,4,5-trichlorophenoxy acetic acid is reacted with a copolymer of 5 mol percent chloromethylsiloxane, 94 mol percent phenylmethylsiloxane and 1 mol percent vinyldimethylsiloxane in accordance with the procedure of Example 1 a copolymer of 5 mol percent of

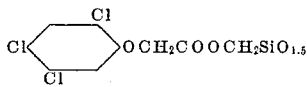

94 mol percent phenylmethylsiloxane and 1 mol percent vinyldimethylsiloxane is obtained.

*Example 4*

When the sodium salt of pentachlorophenoxyacetic acid is reacted with a copolymer of 1 mol percent chloromethyldimethylsiloxane, 90 mol percent dimethylsiloxane and 9 mol percent chlorophenylmethylsiloxane in the manner of Example 1, a copolymer having the composition 1 mol percent pentachlorophenoxyacetoxymethyldimethylsiloxane, 90 mol percent dimethylsiloxane and 9 mol percent chlorophenylmethylsiloxane is obtained.

*Example 5*

When 1 mol of the sodium salt of 2,4-dichlorophenoxyacetic acid is reacted with 1 mol of chloromethylcyclohexyloctadecylallylsilane in accordance with the procedure of Example 1, the compound 2,4-dichlorophenoxyacetoxymethylcyclohexyl octadecyl allyl silane is obtained.

*Example 6*

When 4 mols of the potassium salt of 2,4-dichloro phenoxyacetic acid is reacted with 1 mol of tetrakis-chloromethyldimethyldisiloxane in the manner of Example 1, the compound

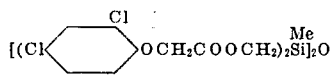

is obtained.

That which is claimed is:

1. An organosilicon compound having the formula

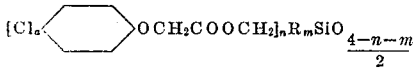

in which $a$ has a value from 1 to 5 inclusive, $n$ has a value from 1 to 2 inclusive, $m$ has a value from 0 to 3 inclusive and R is selected from the group consisting of monovalent hydrocarbon radicals and halogenated aryl hydrocarbon radicals.

2. A compound of the formula

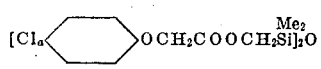

in which $a$ has a value from 1 to 5 inclusive.

3. A compound of the formula

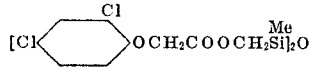

4. A copolymer having per molecule at least 1 siloxane unit of the formula

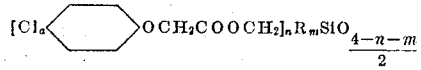

in which $a$ has a value from 1 to 5 inclusive, $n$ has a value from 1 to 2 inclusive, $m$ has a value from 0 to 3 inclusive and R is selected from the group consisting of monovalent hydrocarbon radicals and halogenated aryl hydrocarbon radicals, the remaining siloxane units in said copolymer being of the formula

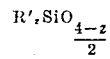

in which R' is selected from the group consisting of monovalent hydrocarbon radicals, halogenated monovalent hydrocarbon radicals and hydrogen atoms and $z$ has a value from 0 to 3 inclusive.

5.

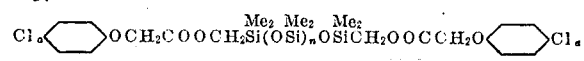

in which $x$ is an integer of at least 1, and $a$ has a value from 1 to 5 inclusive.

6.

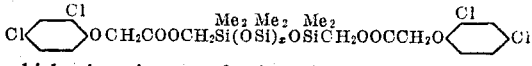

in which $x$ is an integer of at least 1.

No references cited.